United States Patent

Nakamura

[11] 3,900,200
[45] Aug. 19, 1975

[54] SCUFF RESISTANT SLIDING MEMBER

[75] Inventor: Yoshikatsu Nakamura, Yokohama, Japan

[73] Assignee: Nippon Piston Ring Co. Ltd., Tokyo, Japan

[22] Filed: Dec. 4, 1972

[21] Appl. No.: 311,618

[30] Foreign Application Priority Data
Dec. 4, 1971   Japan............... 46-97590

[52] U.S. Cl............... 277/235 A; 164/72; 164/74; 29/156.6; 277/235 R; 427/34; 428/469
[51] Int. Cl............. B05b 7/14; B05b 5/00
[58] Field of Search........... 117/16, 31, 49, 50; 164/74, 72; 29/156.6; 277/235 A, 235 R

[56] References Cited
UNITED STATES PATENTS

| | | | |
|---|---|---|---|
| 2,622,993 | 12/1952 | McCullough et al. | 117/49 |
| 2,914,480 | 11/1959 | Hagopian | 252/62.54 |
| 2,919,486 | 1/1960 | Banquarel | 29/156.6 |
| 3,359,128 | 12/1967 | Humphrey et al. | 117/16 |
| 3,361,562 | 1/1968 | Ulrich et al. | 117/31 |
| 3,364,547 | 1/1968 | Prasse | 29/156.6 |
| 3,421,198 | 1/1969 | Prasse | 29/156.6 |
| 3,473,943 | 10/1969 | Kai et al. | 117/16 |
| 3,503,775 | 3/1970 | Austin | 117/31 |
| 3,542,114 | 11/1970 | Ferree et al. | 164/74 |
| 3,549,357 | 12/1970 | Osborne | 117/31 |
| 3,632,368 | 1/1972 | Nelson | 117/16 |
| 3,644,133 | 2/1972 | Nelson | 117/16 |
| 3,646,993 | 3/1972 | Rice et al. | 277/235 A |
| 3,661,402 | 9/1973 | Iizuka | 277/235 R |
| 3,671,047 | 6/1972 | Umezawa | 277/235 R |
| 3,697,091 | 10/1972 | Prasse et al. | 277/235 A |
| 3,731,941 | 5/1978 | Mori et al. | 277/235 R |
| 3,762,010 | 10/1973 | Iizuka | 29/156.6 |

OTHER PUBLICATIONS

Chemical Abstracts, Vol. 53, p. 13567–f.
"Nature of the Wear and Friction of Mild Steel on Steel, and The Effect of Surface Oxide and Sulfide Layers", Piggott et al., Proc. Conf. Lubrication & Wear, Inst. Mech. Eng., London, 1957, p. 137.

Primary Examiner—Norman G. Torchin
Assistant Examiner—Edward C. Kimlin
Attorney, Agent, or Firm—Sughrue, Rothwell, Mion, Zinn and Macpeak

[57] ABSTRACT

A sliding member, such as a piston ring or cylinder liner, has a scuffing and abrasion resistant surface layer produced by spraying $Fe_3O_4$ on the surface of the base body for the sliding member.

2 Claims, 1 Drawing Figure

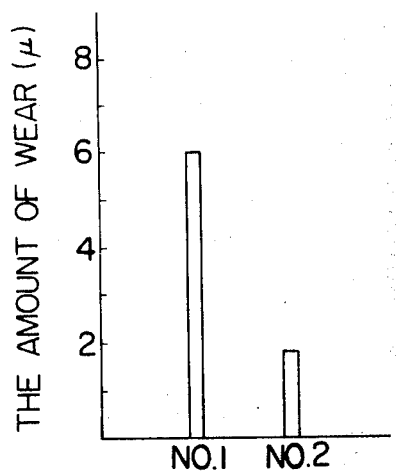

SCUFF RESISTANT SLIDING MEMBER

BACKGROUND OF THE INVENTION

1. FIELD OF THE INVENTION

This invention relates to an improvement in a sliding member required to have excellent scuffing and abrasion resistance such as a piston ring or cylinder liner for an internal combustion engine.

2. DESCRIPTION OF THE PRIOR ART

It is well known to provide a plurality of peripheral grooves on the outer periphery of the piston ring, and to fill a mixture composed of $Fe_3O_4$ powder and sodium silicate as the binder in said grooves and then thermoset the filler material in the grooves by heating. This process is intended to improve the scuffing and abrasion resistance of the piston ring, and the thus obtained piston ring is designated as "ferrox insert ring."

The ferrox insert ring can be used safely under such severe conditions as often causes scuffing, since the lubricating oil impregnated in the ferrox insert part reduces the friction between the piston ring and cylinder. This piston ring, however, can not keep its scuffing and abrasion resistance for long periods of time, since the binding force of the sodium silicate is not so strong and the hardness of the filler material as the whole is not so high.

On the other hand, the ferrox treatment to improve the break-in property between the piston ring and the cylinder is also known, which is characterized by forming a film of $Fe_3O_4$ on the outer periphery of the piston ring. This $Fe_3O_4$ film, however, is very thin and will be removed from the piston ring surface during the break-in period before the piston ring is subjected to the normal operating conditions. Accordingly, this piston ring is not durable for long usage.

Therefore, this invention is intended to eliminate the above said defects of the conventional piston rings and to provide an improved piston ring having favorable scuffing and abrasion resistance, far better than that of the conventional piston rings by making use of the excellent abrasion resisting property of the $Fe_3O_4$ particles.

SUMMARY OF THE INVENTION

The feature of this invention is to form a scuffing and abrasion resistant $Fe_3O_4$ layer on a surface of a base body for a sliding member, such as a piston ring or cylinder liner, by a metal spraying process. The $Fe_3O_4$ particles are preferably sprayed under plasma heat but may be sprayed with other heat sources.

As the fine $Fe_3O_4$ particles are sprayed on the surface of the base body of the sliding member with extremely high velocity, they stick fixedly to the base body surface. The hardness of the sprayed layer is very high so as to even reach Hv (30) 700. Besides, the sprayed layer can be impregnated with the lubricating oil therein due to its porosity. Accordingly, the $Fe_3O_4$ sprayed layer exhibits favorable abrasion resistance, lasting oil keeping property, and excellent scuffing resistance.

Now, more particular embodiments of this invention will be described with reference to the following Example and drawing.

BRIEF EXPLANATION OF THE ACCOMPANYING DRAWING

The single FIGURE shows the abrasion value of a piston ring specimen No. 2 according to this invention and that of the conventional piston ring. Specimen No. 1 has an Mo sprayed sliding surface, the sprayed surface layer being 0.2 mm in thickness. Specimen No. 2 is a piston ring of this invention having an $Fe_3O_4$ sprayed surface layer of 0.1 mm thickness.

EXAMPLE

Pure $Fe_3O_4$ particles were plasma-sprayed on an outer peripheral surface of the cast iron piston ring composed of T.C 3.5 percent, Si 2.6 percent, Mn O. 6 percent and Fe balance to form a sliding layer having 0.1 mm thickness under following spraying conditions. The Hv (30) hardness of the resultant sprayed layer was 700.

| | |
|---|---|
| Spraying gun used; | Meteco 3 M type plasma-spraying gun |
| $N_2$ gas pressure; | 50 lb/in². |
| $N_2$ gas flow volume; | 150 l/hr. |
| $H_2$ gas pressure; | 50 lb/in. |
| $H_2$ gas flow volume; | 10 l/hr. |
| Electric current; | 500 A |
| Distance between the spraying gun and the base body surface; | 4 in. |

The piston ring having the $Fe_3O_4$ sprayed layer thus obtained and the conventional piston ring obtained by plasma-spraying a Mo layer having 0.2 mm thickness were subjected to the actual engine test to examine their abrasion resistance under the following conditions.

| | | |
|---|---|---|
| Engine used; | forcibly air cooled horizontally confronted 2 cylinder, 4 cycle engine | |
| | inner diameter × stroke; | 83 × 73 mm |
| | total exhausting vovlume; | 790 cc |
| | maximum output; | 36ps/4600 rpm. |
| Operating conditions; | | |
| | speed; | 5000 rpm. |
| | horse power; | 22 ps |
| | load | 7 Kg |
| | running time; | 50 hr. |
| | oil temp.; | 110 ± 10° C. |
| | cylinder alloy | FC 25 (JIS) |

The test results are shown in the FIGURE, in which the No. 1 specimen is a conventional piston ring having the sprayed layer of Mo 100 percent with the thickness of 0.2mm, and the No. 2 specimen is the piston ring of this invention having the sprayed layer of $Fe_3O_4$ 100 percent with the 0.1 mm thickness.

It will be understood from the test results that the abrasion amount of the specimen No. 2 is less than 1/3 of that of the specimen No. 1 and the latter is well resistant to the abrasion.

As particularly mentioned above, the sliding member of this invention has the sliding surface which exhibits both excellent scuffing and abrasion resistances.

While this invention has been described with reference to particular embodiments thereof, it will be understood that the numerous modifications may be made by those skilled in the art without actually departing from the scope of the invention. Therefore, the appended claim is intended to cover all such equivalent variations as coming the true spirit and scope of the invention.

What is claimed is:

1. A piston ring having a high scuffing and abrasion resistant sliding surface layer, saic piston ring comprising:
 a cast iron body and
 a hot metal sprayed $Fe_3O_4$ particle layer on the sliding surface of the cast iron base body, said hot metal sprayed $Fe_3O_4$ layer having an Hv (30) hardness of approximately 700 and being of approximately 0.1 mm in thickness.

2. The piston ring as claimed in claim 1, wherein said cast iron base body is composed of 3.5 percent T. C., 2.6 percent Si, 0.6 percent Mc and the balance Fe, by weight, and wherein said $Fe_3O_4$ layer comprises a heat plasma sprayed layer.

* * * * *